US009768903B2

(12) United States Patent
Yan et al.

(10) Patent No.: US 9,768,903 B2
(45) Date of Patent: Sep. 19, 2017

(54) FLEXIBLE GRID TWDM-PON ARCHITECTURE AND INTELLIGENT SET-UP FOR TWDM-PON

(71) Applicant: Futurewei Technologies, Inc., Plano, TX (US)

(72) Inventors: Xuejin Yan, Santa Clara, CA (US); Feng Wang, Bedminster, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/218,811

(22) Filed: Jul. 25, 2016

(65) Prior Publication Data

US 2016/0337071 A1    Nov. 17, 2016

Related U.S. Application Data

(62) Division of application No. 14/541,018, filed on Nov. 13, 2014, now Pat. No. 9,432,140.

(Continued)

(51) Int. Cl.
*H04B 10/00* (2013.01)
*H04J 14/02* (2006.01)
(Continued)

(52) U.S. Cl.
CPC ........ *H04J 14/0223* (2013.01); *G02B 6/2938* (2013.01); *G02B 6/29344* (2013.01);
(Continued)

(58) Field of Classification Search
USPC ...................................... 398/66–73
See application file for complete search history.

(56) References Cited

U.S. PATENT DOCUMENTS 6,606,433 B2   8/2003  Oguma et al.
6,674,968 B1 * 1/2004  Xie ........................ G02B 6/272
                                                    359/484.05

(Continued)

FOREIGN PATENT DOCUMENTS

WO    WO2013066520 A1    5/2013

OTHER PUBLICATIONS

Foreign Communication From a Counterpart Application, PCT Application No. PCT/US14/65560, International Search Report dated Sep. 1, 2015, 4 pages.

(Continued)

*Primary Examiner* — Agustin Bello
(74) *Attorney, Agent, or Firm* — Conley Rose, P.C.

(57) ABSTRACT

An approach to proving a flexible grid architecture for time and wavelength division multiplexed passive optical networks is described. One embodiment includes an optical transmitter array configured to transmit an optical signal, an optical combiner coupled to the optical transmitter array configured to receive unlocked wavelengths from the optical transmitter array and output a single optical signal, and an optical amplifier coupled to the optical combiner configured to boost downstream optical power. In some embodiments, a WDM filter is coupled to the optical amplifier, and a tunable optical network unit (ONU) coupled to the WDM filter is configured to transmit and receive the optical signals. In still other embodiments, a cyclic demultiplexer is coupled to the optical splitter and connects to an optical receiver array configured to receive optical signals.

22 Claims, 10 Drawing Sheets

Related U.S. Application Data

(60) Provisional application No. 61/903,593, filed on Nov. 13, 2013.

(51) Int. Cl.
  H04B 10/27 (2013.01)
  H04J 14/08 (2006.01)
  G02B 6/293 (2006.01)
  H04Q 11/00 (2006.01)

(52) U.S. Cl.
  CPC ......... G02B 6/29361 (2013.01); H04B 10/27 (2013.01); H04J 14/0282 (2013.01); H04J 14/08 (2013.01); H04Q 11/0067 (2013.01); *H04Q 2011/0009* (2013.01); *H04Q 2011/0015* (2013.01); *H04Q 2011/0016* (2013.01); *H04Q 2011/0086* (2013.01)

(56) References Cited

U.S. PATENT DOCUMENTS

| | | | | |
|---|---|---|---|---|
| 7,079,715 | B2* | 7/2006 | Kish, Jr. | B82Y 20/00 372/26 |
| 7,317,874 | B2* | 1/2008 | Li | H04B 10/506 398/67 |
| 7,428,385 | B2 | 9/2008 | Lee et al. | |
| 7,440,701 | B2* | 10/2008 | Li | H04B 10/2939 398/135 |
| 7,450,848 | B2* | 11/2008 | Li | H04J 14/02 398/68 |
| 7,471,899 | B2* | 12/2008 | Kim | H04J 14/0226 398/63 |
| 7,493,042 | B2* | 2/2009 | Li | H04J 14/02 398/68 |
| 7,684,703 | B2* | 3/2010 | Harada | H04J 14/02 398/151 |
| 7,706,643 | B1 | 4/2010 | Meli et al. | |
| 7,706,688 | B2* | 4/2010 | Boudreault | H04J 14/0212 398/59 |
| 7,787,771 | B2 | 8/2010 | Kim et al. | |
| 8,023,821 | B1* | 9/2011 | Birk | H04J 14/0227 398/46 |
| 8,027,586 | B2 | 9/2011 | Ikeda et al. | |
| 8,320,760 | B1* | 11/2012 | Lam | H04J 14/002 398/66 |
| 8,406,631 | B2 | 3/2013 | Murry | |
| 8,406,636 | B2 | 3/2013 | Zou | |
| 8,565,599 | B2* | 10/2013 | Bouda | H04J 14/0226 398/66 |
| 8,600,234 | B2 | 12/2013 | Hirth et al. | |
| 8,655,190 | B2* | 2/2014 | Wu | H04B 10/5053 398/202 |
| 8,744,265 | B2* | 6/2014 | Effenberger | H04B 10/272 398/14 |
| 8,781,322 | B2* | 7/2014 | Lam | H04J 14/0282 370/352 |
| 8,824,889 | B2 | 9/2014 | Effenberger | |
| 8,861,954 | B2 | 10/2014 | Sugawa et al. | |
| 8,942,560 | B2 | 1/2015 | Hirth et al. | |
| 8,953,942 | B1* | 2/2015 | Lam | H04J 14/0256 398/68 |
| 9,031,409 | B2 | 5/2015 | Nandiraju et al. | |
| 9,420,359 | B2* | 8/2016 | Cvijetic | H04Q 11/0067 |
| 2001/0004290 | A1* | 6/2001 | Lee | H04B 10/564 398/79 |
| 2004/0179855 | A1* | 9/2004 | Harada | H04J 14/02 398/197 |
| 2005/0123300 | A1* | 6/2005 | Kim | H04J 14/0226 398/84 |
| 2005/0265725 | A1* | 12/2005 | Okano | H04B 10/572 398/147 |
| 2006/0002706 | A1* | 1/2006 | Lee | H04J 14/0226 398/71 |
| 2006/0120724 | A1* | 6/2006 | Ishimura | H04J 14/0226 398/75 |
| 2006/0228113 | A1 | 10/2006 | Cutillo et al. | |
| 2007/0025734 | A1 | 2/2007 | Oogushi et al. | |
| 2007/0065076 | A1* | 3/2007 | Grek | G02B 6/12026 385/37 |
| 2007/0092256 | A1* | 4/2007 | Nozue | H04J 14/0282 398/72 |
| 2007/0140693 | A1* | 6/2007 | Li | H04B 10/2939 398/67 |
| 2007/0154217 | A1 | 7/2007 | Kim et al. | |
| 2009/0016679 | A1* | 1/2009 | Das | G02B 6/12016 385/37 |
| 2009/0110400 | A1* | 4/2009 | Nozue | H04J 14/0282 398/71 |
| 2010/0196011 | A1* | 8/2010 | Liu | H04J 14/0246 398/79 |
| 2011/0085794 | A1 | 4/2011 | Lei et al. | |
| 2011/0182578 | A1* | 7/2011 | Cavaliere | H04B 10/2587 398/58 |
| 2011/0274433 | A1* | 11/2011 | Presi | H04B 10/25759 398/97 |
| 2013/0177313 | A1 | 7/2013 | Hirth et al. | |
| 2013/0243435 | A1 | 9/2013 | Hirth et al. | |
| 2015/0139651 | A1 | 5/2015 | Xuejin et al. | |
| 2015/0207585 | A1 | 7/2015 | Luo et al. | |
| 2016/0337071 | A1* | 11/2016 | Yan | H04B 10/27 |

OTHER PUBLICATIONS

Foreign Communication From a Counterpart Application, PCT Application No. PCT/US14/65560, Written Opinion dated Sep. 1, 2015, 5 pages.

Notice of Allowance dated Apr. 21, 2016, 14 pages, U.S. Appl. No. 14/541,018, filed Nov. 13, 2014.

* cited by examiner

FLEXIBLE GRID TWDM-PON ARCHITECTURE AND INTELLIGENT SET-UP FOR TWDM-PON

CROSS-REFERENCE TO RELATED APPLICATIONS

This application is a divisional application of U.S. patent application Ser. No. 14/541,018 filed on Nov. 13, 2014 by Xuejin Yan and Feng Wang and titled "Flexible Grid TWDM-PON Architecture and Intelligent Set-Up for TWDM-PON," which claims priority to U.S. provisional patent application No. 61/903,593 filed on Nov. 13, 2013 by Xuejin Yan and Feng Wang and titled "Flexible Grid TWDM-PON Architecture," which are incorporated by reference.

FIELD

The present invention generally relates to the field of passive optical networks. More specifically, the present invention relates to providing a flexible-grid passive optical network (PON) architecture.

BACKGROUND

A PON is one type of optical access network for providing network access over "the last mile" of service. A PON is a point-to-multipoint network includes an optical line terminal (OLT) at a central office (CO), a plurality of optical network units (ONUs) at the user premises, and an optical distribution network (ODN) connecting the OLT and the ONUs. PONs may also include remote nodes (RNs) located between the OLTs and the ONUs, for example, at the end of a road where multiple users reside.

TWDM-PON stands for time and wavelength division multiplex passive optical networks. TWDM-PON is used for fiber to the home (FTTH) or FTTX, where X can be a premises, curb, or drop point, for example. In a TWDM-PON system, multiple wavelengths will be used for downstream and upstream transmission. For each wavelength, time division will be used; for multi-wavelengths, wavelength division will be used. There are Wavelength Division Multiplexers and Demultiplexers at the central office to combine downstream multi-wavelengths into a fiber and separate upstream multi-wavelengths into different receivers. At customer side, downstream wavelengths are transmitted to all tunable ONUs, and the tunable receiver of the ONU will pick up one wavelength from the downstream wavelengths. For upstream multi-wavelength light, which comes from tunable transmitters of the ONUs, the demultiplexer will separate the multi-wavelength light to different channel receivers at the OLT side.

Many PONs presently use wavelength division multiplexers to combine optical signals into a fiber for transmission. This approach introduces significant cost and complexity as new devices are added or deleted and the topography of the network changes. Also, this approach fails to provide automatic channel alignment and channel set-up for downstream and upstream channels at the system level.

SUMMARY

In one embodiment, an apparatus for performing time and wavelength division multiplexing is disclosed, the apparatus includes an optical transmitter array having a first optical transmitter and a second optical transmitter configured to transmit an optical signal, an optical combiner coupled to the optical transmitter array configured to receive the optical signal from the optical transmitter array and output a multi-wavelength optical signal, and an optical amplifier coupled to the optical combiner configured to boost downstream optical power, where the optical combiner is configured to receive a first optical signal having a first wavelength and a second optical signal having a second wavelength different from the first wavelength, and where an output of the first optical transmitter and an output of the second optical transmitter having intermediate grid wavelength values.

Some embodiments further provide a WDM filter coupled to the optical amplifier, and one or more tunable optical network units (ONUs) coupled to the WDM filter configured to transmit and receive optical signals, where the WDM filter is configured to selectively transmit downstream messages generated by the optical transmitter array and selectively transmit upstream signals generated by the one or more tunable ONUs. Other embodiments further provide a cyclic demultiplexer coupled to the optical splitter having a passband width and a rejection band width, and an optical receiver array coupled to the cyclic demultiplexer configured to receive optical signals from the WDM filter, where the passband width of the cyclic demultiplexer is larger than the rejection band width of the cyclic demultiplexer.

In another embodiment, a method of performing online receiver characterization for a tunable optical network unit (ONU) having matching upstream and downstream channels is described. The method includes tuning an optical receiver of an ONU to one of the downstream channels, then another downstream channel, until finish all downstream channel characterization. After that, ONU tunable receiver sets its filter to one of the downstream channels to receive OLT broadcasting registration or channel checking signal with downstream channel ID.

In another embodiment, a method of performing channel checking and matching for a tunable optical network unit having different upstream and downstream channels is described. The method includes receiving a first channel number from an optical line terminal (OLT) at a tunable ONU, tuning the downstream channel of the tunable ONU based on the first channel number, waiting for a channel checking and matching message, determining if the downstream channel and upstream channel of the tunable ONU are the same channel number, and if the downstream channel and upstream channel of the tunable ONU are the same channel number, entering registration status at the tunable ONU. If the downstream channel and upstream channel of the tunable ONU are not the same channel number, transferring upstream information from the tunable ONU to the OLT, where the upstream information relates to an ONU receiving channel, receiving a second channel number from the OLT, tuning the tunable ONU based on the second channel number and the upstream information, entering registration status at the tunable ONU.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
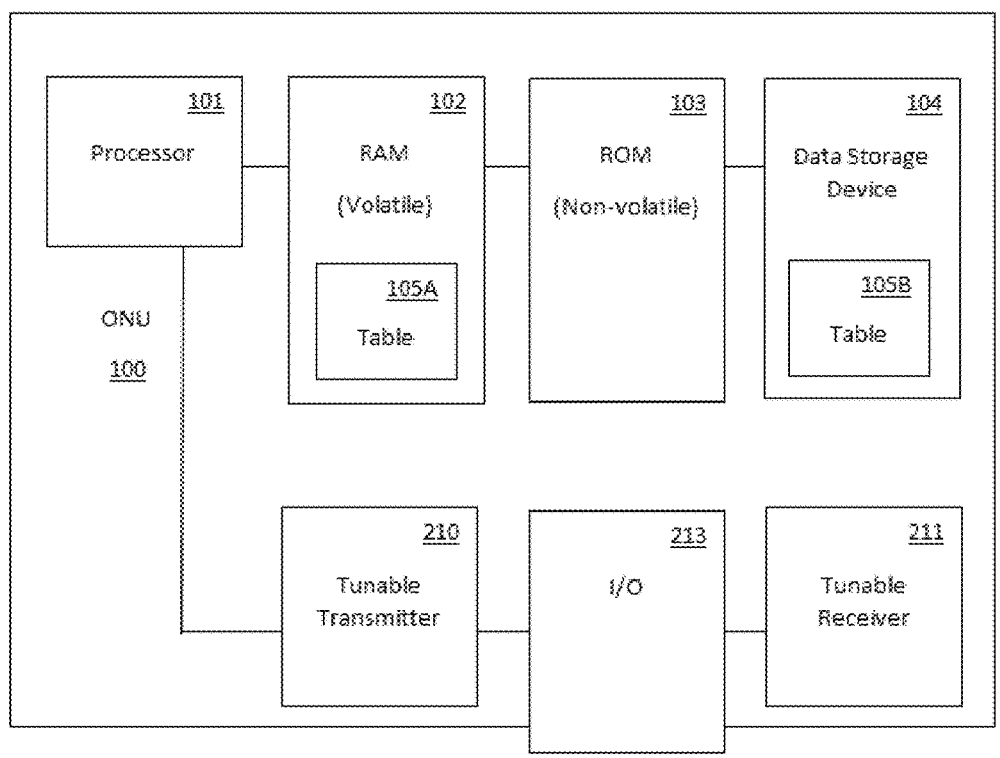
FIG. 1 is a block diagram of an exemplary ONU having a processor and memory according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Flexible Grid TWDM-PON Architecture

In the following embodiments, techniques for proving a flexible grid architecture for time and wavelength division multiplexed passive optical networks are described. One described embodiment includes an optical transmitter array configured to transmit multi-wavelength optical signals, an optical combiner couples the optical transmitter array output light into one waveguide or one fiber, and an optical amplifier coupled to the optical combiner output configured to receive unlocked wavelengths from the optical transmitter array and output a multi-wavelength optical signal, and configured to boost downstream optical power. In some embodiments, a wavelength division multiplexing (WDM) optical filter is coupled to the optical amplifier configured to separate or combine downstream and upstream optical signals and pass a portion of the downstream signals to an optical splitter and reflect upstream optical signals to a demultiplexer coupled to the optical filter. One or more tunable optical network units coupled to the optical splitter are configured to transmit and receive optical signals. In still other embodiments, a cyclic demultiplexer is coupled to the optical filter and connects to an optical receiver array configured to receive optical signals.

Figure 2:
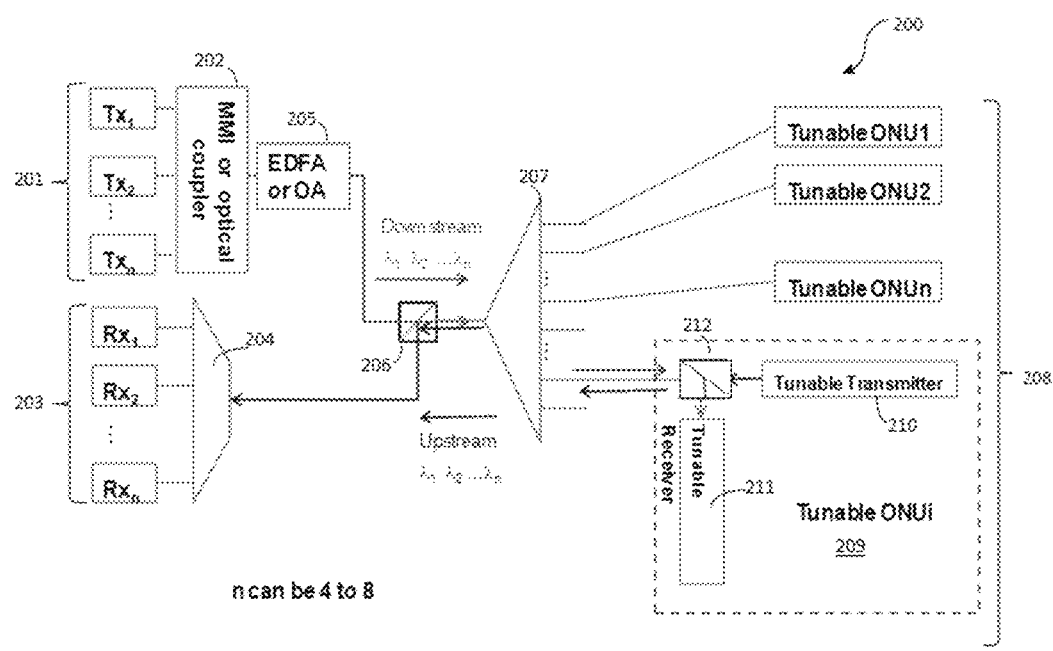
FIG. 2 is a diagram illustrating an exemplary flexible grid TWDM-PON diagram according to embodiments of the present invention.

Features of the present invention provide TWDM-PON systems that are more cost-effective, flexible, reliable, and manageable. One key feature relaxes the downstream and upstream wavelength grid to bring the system's optical module cost down, while at same time making the system more flexible, manageable, and intelligent. FIG. 2 depicts an exemplary flexible grid TWDM-PON schematic diagram according to some embodiments.

With regard to FIG. 1, an exemplary Optical Network Unit (ONU) 100 is depicted according to embodiments of the present invention. ONU 100 includes a processor (e.g., a general purpose process or a network processor) coupled to RAM 102, ROM 103, and Data storage device 104 for storing data. Table 105A of RAM 102 and Table 105B of Data storage device 104 may be used to store upstream and/or downstream channel setting parameters. As discussed in greater detail below, channel setting parameters may comprise gain, phase, DBR current, and/or TEC temperature channel settings. Input/output (I/O) 213 may be used to send and receive optical signals using tunable receiver 211 and/or tunable transmitter 210.

With regard now to FIG. 2, an exemplary TWDM-PON system 200 is depicted according to embodiments of the present invention. A downstream transmitter array 201 of the TWDM-PON system 200 is coupled to a multimode interface (MMI) or optical combiner 202. The downstream transmitter array 201 comprises one or more transmitters (e.g., transmitters Tx1, Tx2, . . . Txn). According to some embodiments of the present invention, the transmitters (e.g., transmitters Tx1, Tx2, . . . Txn) comprise OLT (optical line terminal) transceivers. For a four-downstream wavelength transmitter array, monolithic integration multi-wavelength transmitter array with an MMI (or Star) coupler may be used and offers advantages over using an AWG multiplexer. An MMI coupler size is much smaller than an AWG multiplexer size, and package costs are much lower because only one fiber to the array output waveguide is used. The MMI and optical couplers are not wavelength sensitive optical combiners, and they are configured to combine each channel into an output waveguide regardless of wavelength. The coupling efficiency of the laser output power to the optical fiber is similar to using an AWG multiplexer. This potentially lowers the transmitter cost.

For an eight-downstream channel transmitter array, laser output power may be raised by increasing laser length. For a 10 Gb/s data rate, the laser is biased at a static current value. The mode size converter is integrated with the laser array to enhance the array coupling efficiency from the output waveguide to the fiber.

An optical amplifier 205 (e.g., an Erbium Doped Fiber Amplifier) is added to boost downstream optical power. The output of the optical amplifier 205 passes through WDM filter 206 to optical splitter 207. WDM filter 206 directs optical signals to and from tunable ONU array 208, and optical splitter 207 splits optical signals for tunable ONUs. Tunable ONU array 208 comprises one or more tunable ONUs (e.g., Tunable ONU 1, Tunable ONU 2, Tunable ONU n, Tunable ONU i). As illustrated by exemplary Tunable ONU i (209), a tunable ONU comprises a tunable transmitter 210 and a tunable receiver 211. The tunable transmitter 210 and a tunable receiver 211 may be coupled to an optical splitter or a WDM filter 212 for sending and receiving data over an optical signal.

For demultiplexer 204, it may be desirable for its passband width to be larger than its rejection band width. For example, the demultiplexer may be cyclic and its 1 dB passband width may be larger than 60% of the channel space. Therefore, with a 100 GHz channel space, its passband width may be greater than or equal to 60 GHz. The adjacent channel rejection ratio should be larger than 20 dB.

A wide passband cyclic demultiplexer has several advantages compared to a regular cyclic demultiplexer. There is a higher chance of ONU upstream wavelength falling into any channel passband even without laser wavelength characterization. Also, it is insensitive to small drifts of the upstream wavelength and has much larger tolerance for tunable laser wavelength tuning accuracy. Optical receiver array 203 comprises one or more receivers (e.g., receivers Rx1, Rx2, . . . Rxn) and receives the output of demultiplexer 204, which may comprise a wide passband cyclic demultiplexer.

Figure 3:
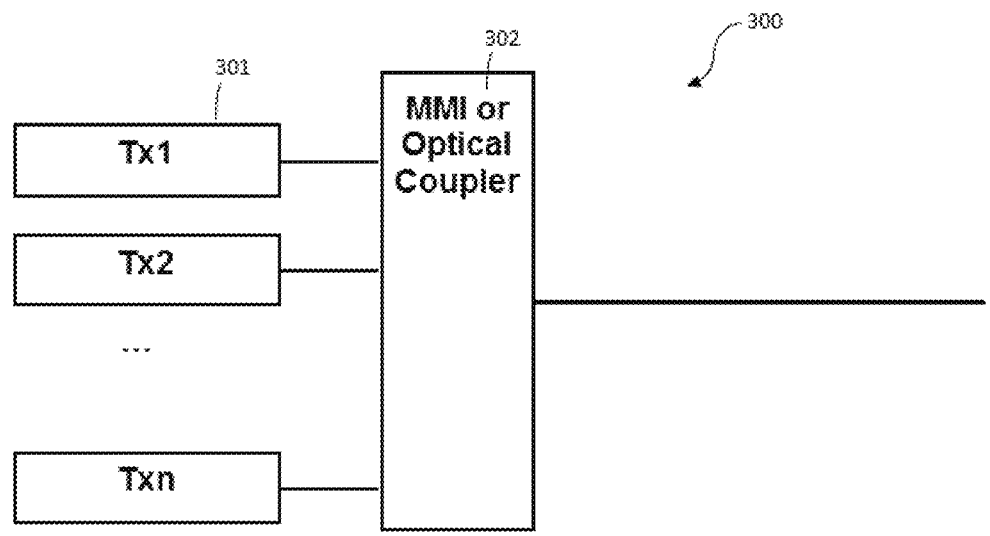
FIG. 3 is a diagram illustrating an exemplary downstream transmitter array diagram according to embodiments of the present invention.
Figure 4:
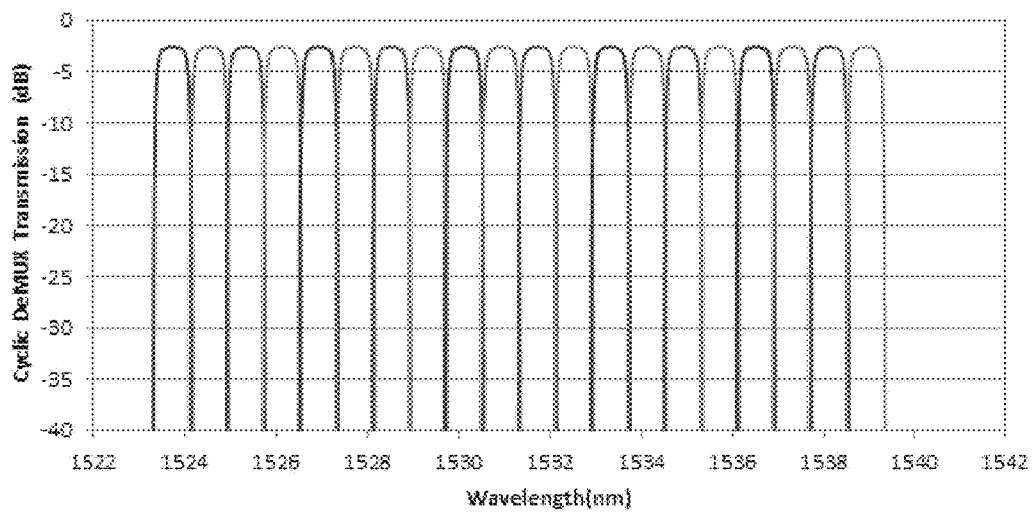
FIG. 4 is a graph of an exemplary wide pass-band cyclic demultiplexer spectra according to embodiments of the present invention.

FIG. 3 depicts an exemplary downstream transmitter array diagram according to embodiments of the present invention. The multi-wavelength transmitter array 300 comprises multi-discrete transmitters (e.g., multi-discrete transmitters 301) or a monolithic integration laser array with a modulator array and an MMI or Optical coupler 302. The wavelengths do not need to be on the grid (e.g., intermediate grid wavelengths) and the laser wavelength values do not need to be locked in at any position. In other words, for a laser position in the array, the wavelength can be different from one laser array to another.

Tunable Receiver Self-Characterization of Flexible Grid TWDM-PON ONU

Because OLT multi-channel transmitter array wavelengths may not have a specific value for each channel and may be any value within the wavelength range, such as a ±0.2 nm range off the grid, the ONU tunable receiver may use online characterization for its downstream channel position setting. According to some embodiments of the present invention, a tunable receiver consists of a thermal tuning tunable filter, a regular receiver, filter wavelength tuning circuits, and average optical power monitor circuits. When changing the filter heating current, the filter transmission peak moves and the average optical power at the receiver changes. When the filter peak matches a downstream wavelength, the average power reaches its peak. When increasing heating current continuously, the filter peak moves away from that channel and the average optical power decreases. When the peak moves close to the wavelength of the next channel, the average optical power increases. When the peak matches the next channel wavelength, the average optical power reaches yet another peak.

Figure 5:
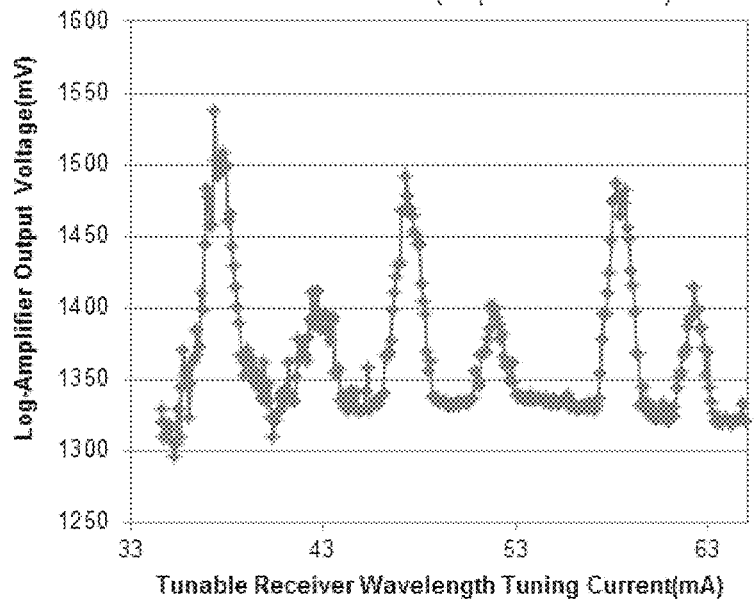
FIG. 5 is a graph of experimental tunable receiver online characterization results according to embodiments of the present invention.

FIG. 5 shows tunable receiver online characterization results according to one embodiment. According to the depicted embodiment, there are four downstream wavelengths with a 10 Gb/s data rate for each wavelength. Because the tunable filter is a cyclic filter and its free spectral range (FSR) is about 3.6 nm at 1550 nm wavelength, six peaks are detected. In the example of FIG. 5, the first peak is channel 1, the second peak is channel 2, the third peak is channel 3, the fourth peak is channel 4, the fifth is channel 1, and sixth peak is channel 2. This data is saved into the receiver memory and an ONU microcontroller processes the data and locates the tunable filter bias current values for the downstream channels which correspond to peak average optical power. The filter bias current values for downstream channels are saved into receiver memory for filter channel setting and switching.

Tunable DFB Transmitter On-Line Characterization of Flexible Grid TWDM-PON ONU

According to some embodiments of the present invention, a DFB laser used for tunable ONU on-line characterization has the following specifications. First, the DFB laser wavelength falls into 1520 nm to 1540 nm range; such as: 1522≤λ≤1538 (TEC: 30° C.). Second, the DFB laser has average optical power: ≥4 dBm (TEC: 65° C.). Third, the side mode suppression ratio (Side-Mode Suppression Ratio (SMSR): RF signal on): ≥30 dB (for TEC temperature tuning range; such as, 20 to 65° C. range).

The following sections A-F disclose online characterization procedures for a tunable DFB laser based ONU according to embodiments of the present invention.

Section A: ONU DFB Tunable Transmitter Self-Characterization and Channel Set-Up (with Down and Upstream Using the Same Channel).

Figure 10:
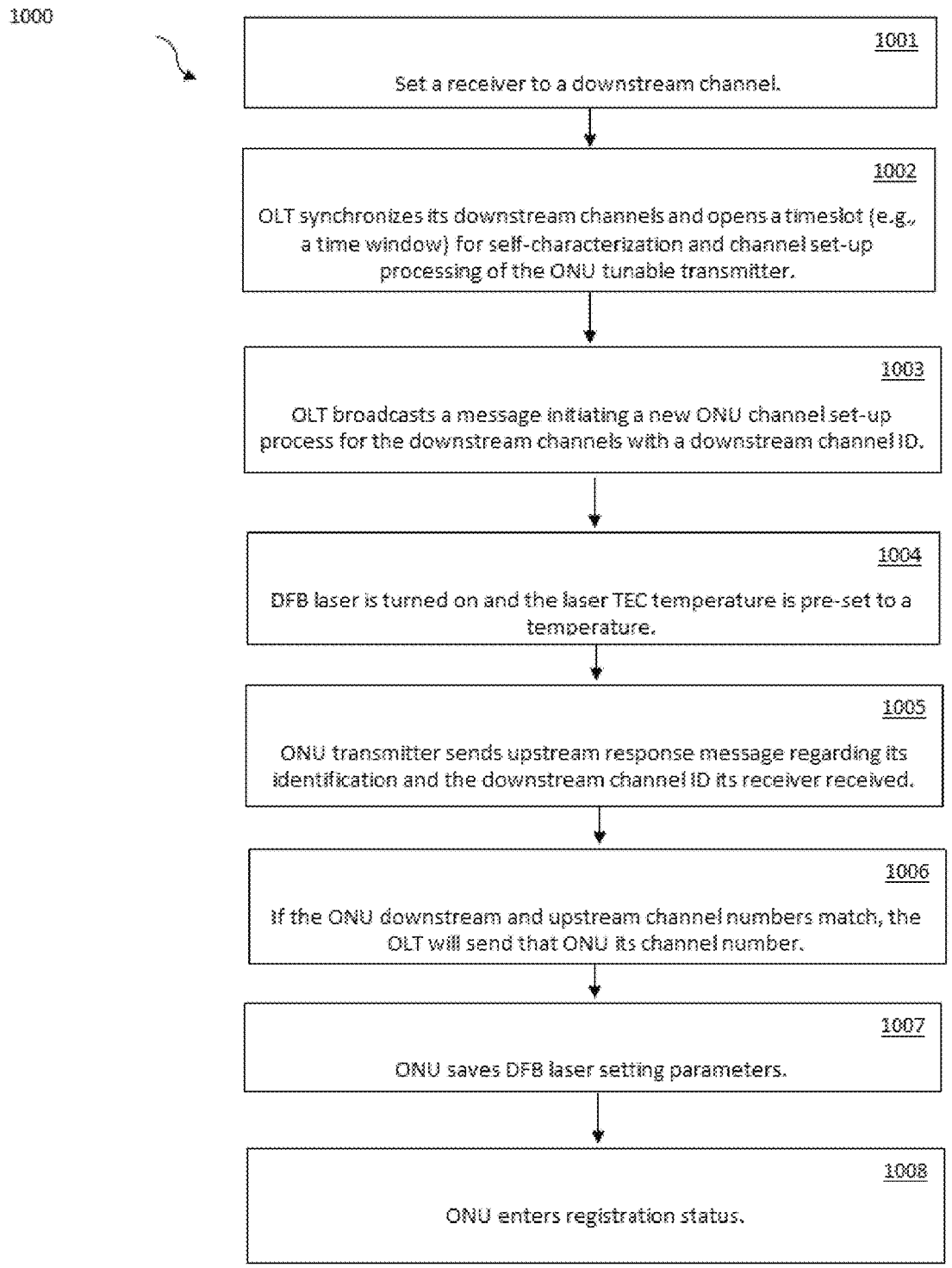
FIG. 10 is a flow chart illustrating an exemplary ONU DFB Tunable Transmitter Self-characterization and Channel Set-Up procedure according to embodiments of the present invention.

With regard to FIG. 10, a flow chart illustrating an exemplary ONU DFB Tunable Transmitter Self-characterization and Channel Set-Up procedure 1000 is depicted according to embodiments of the present invention. According to some embodiments, the channel checking and matching procedures begin by setting a receiver to one of the downstream channels (step 1001). The OLT synchronizes its downstream channels and opens a timeslot (e.g., a time window) for self-characterization and channel set-up processing of the ONU tunable transmitter (step 1002). The OLT broadcasts a message initiating a new ONU channel set-up process for the downstream channels with a downstream channel ID (step 1003). After the new ONUs receive the message, the DFB laser is turned on and the laser TEC temperature is pre-set to a predetermined temperature (e.g., 35° C.) (step 1004). The ONU transmitter sends upstream response message regarding its identification and the downstream channel ID that its receiver received (step 1005). The OLT compares the downstream and upstream channel numbers, and if the ONU downstream and upstream channel numbers match, the OLT sends that ONU its channel number (step 1006). The ONU saves DFB laser setting parameters (e.g., TEC temperature or bias current values) in memory (step 1007). According to some embodiments, the setting parameters are stored in a table (e.g., table 105A or 105B) residing in memory (e.g., RAM 102 or Data storage device 104). The ONU then enters a registration status (step 1008).

Section B: ONU DFB Tunable Transmitter Self-Characterization and Channel Set-Up (where Downstream and Upstream are not at the Same Channel).

Figure 11:
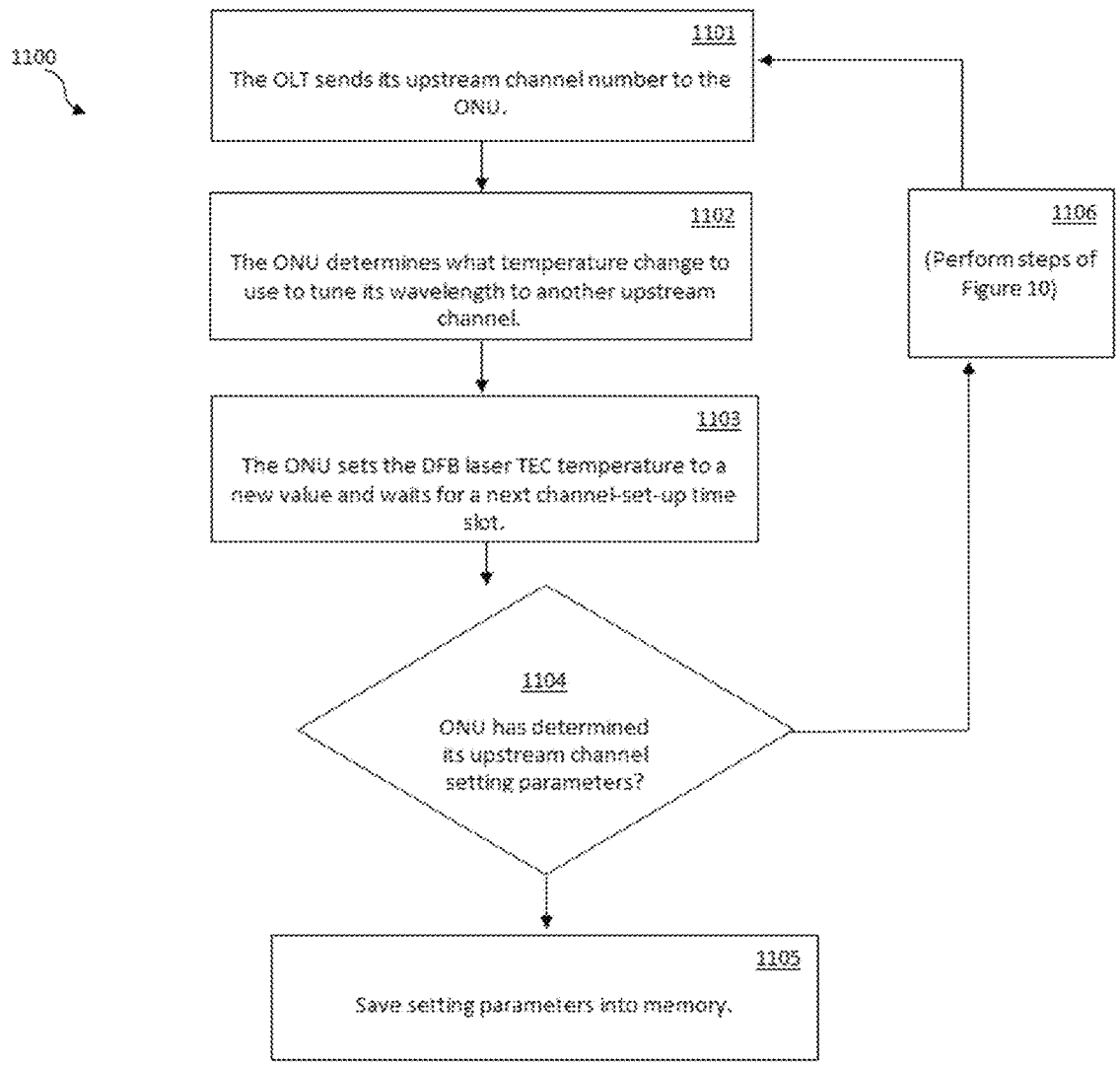
FIG. 11 is a flow chart illustrating an exemplary ONU DFB Tunable Transmitter Self-characterization and Channel Set-Up procedure according to embodiments of the present invention, where Downstream and Upstream are not at the same channel.

With regard to FIG. 11, a flow chart illustrating an exemplary ONU DFB Tunable Transmitter Self-characterization and Channel Set-Up procedure 1100 is depicted according to embodiments of the present invention, where Downstream and Upstream are not at the same channel. According to some embodiments, if the ONU downstream and upstream are not at same channel, the OLT sends its upstream channel number (e.g., the receiving channel transfers an upstream channel number to a downstream channel) to the ONU (step 1101). After the ONU receives its current upstream channel number, the ONU determines what temperature change to use to tune its wavelength to another upstream channel (step 1102). In one example, an ONU increases or decreases the temperature by 7.4° C. and moves its wavelength to the two adjacent channels. The ONU sets the DFB laser TEC temperature to a new value and waits for a next channel-set-up time slot (step 1103). The ONU repeats the steps of Section A above and the previous steps of Section B until it locates its upstream channel setting parameters (step 1104). The setting parameters are saved into memory (e.g., saved in a table resident in memory) (step 1105). The ONU has finished its DFB tunable laser self-characterization processing and the upstream channel setting parameters and setting parameters for one downstream receiver channel are saved into memory.

Section C: ONU DFB Tunable Transmitter Self-Characterization and Channel Set-Up (where Upstream Messages have Crashed).

When two or more ONU upstream messages overlap at the OLT side (e.g., two upstream lights in one upstream channel in Section A), that channel receiver is not able to read the entire message and is not able to send the ONU its information (e.g., channel number). Average optical power from the OLT receiver optical power monitor indicates a high average optical power value. If the average optical power value is greater than the receiver optical power sensitivity average optical power value, the OLT detects that the upstream signals have crashed. The OLT informs that channel's ONUs that the upstream channel has crashed. After the ONUs receive the message, the ONUs attempts the channel again after the next Checking and Matching window comes with a random delay for each ONU until they enter registration status.

Section D: ONU DFB Tunable Transmitter Self-Characterization and Channel Set-Up.

The upstream ONU DFB laser wavelength may not fall into the pass-band of the demultiplexer at the OLT side after following the procedures detailed above in Section A. When an upstream signal is outside the pass-band of a DeMUX, the upstream signal may be too weak to determine its channel for the OLT. When the receiver average optical power value is below a certain threshold, the OLT does not send downstream information. According to some embodiments of the present invention, the ONU does not receive any response for its upstream messages and determines that it is not on the correct upstream channel. The ONU tunes its DFB laser wavelength by changing the TEC temperature. The temperature change is determined by the cyclic DeMUX pass-band width at the OLT side. The laser frequency shift value may be made less than the pass-band width of the DeMUX and larger than rejection band width (e.g., channel space frequency minus the pass-band width) by changing TEC temperature. For example, where the channel space is 100 GHz and the DeMUX pass-band width is 60 GHz, the frequency shift is between 40 GHz and 60 GHz. The ONU sets the DFB laser to the new TEC temperature and waits for a next channel set-up time slot. The ONU then repeats Section A channel set-up procedures.

Section E: ONU Completing Tunable Receiver Channel Set-Up.

After finishing an upstream channel set-up procedure, an ONU receiver has also completed one downstream channel set-up. The procedures of this section finish the set-up for the other ONU receiver downstream channels and complete the downstream receiver set-up table. The ONU first sets its tunable receiver to another downstream channel. The ONU repeats the DFB tunable laser channel set-up procedures (e.g., the procedures of Section A or Section B) and finds the tunable filter setting downstream channel number. The ONU saves that channel tunable receiver setting parameters into a table. The ONU then sets its receiver to another channel. The above steps are repeated and the ONU determines downstream channel setting parameters for its tunable receiver and saves the setting parameters into the table. The ONU has finished its upstream and downstream channel setting processing at this time.

Section F: DFB Laser Wavelength Tuning Experimental Results by Changing TEC Temperature Experimental Conditions.

Figure 6:
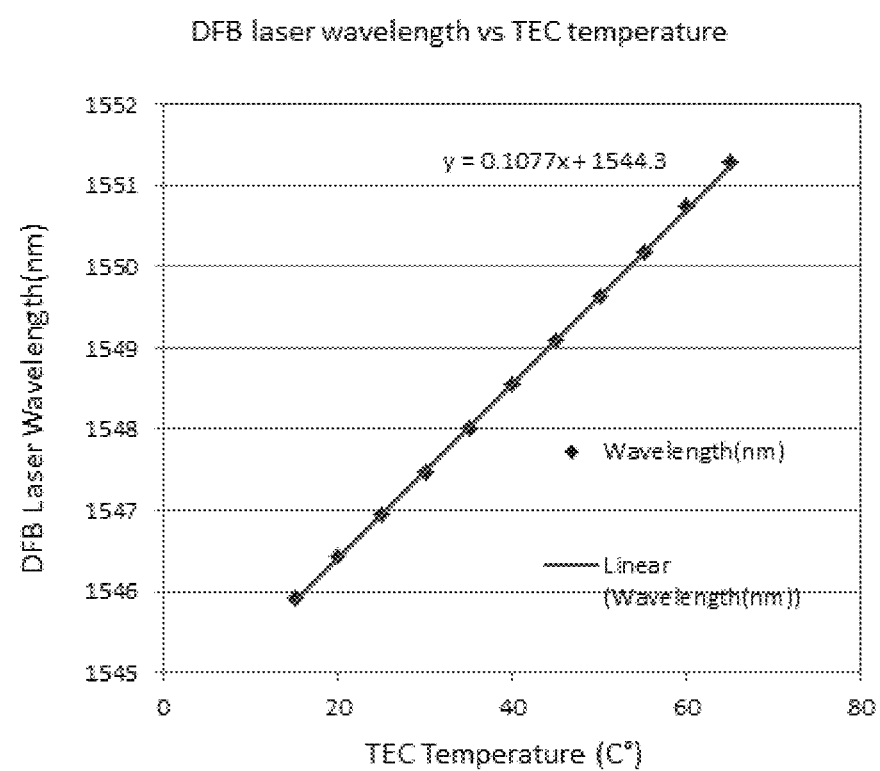
FIG. 6 is a graph of experimental distributed feedback (DFB) laser wavelength results with TEC temperature changing according to embodiments of the present invention.

With regard to FIG. 6, exemplary DFB laser wavelength results based on TEC temperature changes are disclosed according to embodiments of the present invention. The DFB laser output power is maintained constant as the TEC temperature changes, where the vertical axis represents DFB laser wavelength and the horizontal axis represents TEC temperature in Celsius units. As depicted, wavelength shift has a linear relationship with TEC temperature change within the DFB laser working temperature range. According to some embodiments, the laser wavelength increases 0.1077 nm per one degree temperature increase. For example, for 0.8 nm wavelength tuning, TEC temperature change is 7.4° C., and for 0.32 nm wavelength tuning, TEC temperature change is 3.0° C.

DBR Tunable Laser-Based ONU Application for Flexible Grid TWDM-PON System

A three-section DBR tunable laser is a cost-effective light source for the ONU of the disclosed Flexible Grid TWDM-PON. Furthermore, it is not necessary to characterize the DBR tunable laser for ONU transmitter channels and wavelengths during manufacturing. There are several wavelengths that fall into every cyclic DeMUX channel because the DBR laser has a large wavelength tuning range (e.g., >10 nm). Also, the DBR laser mode wavelength space for two DBR bias current values can be made to nearly match the DeMUX channel space. This simplifies tunable ONU registration.

According to some embodiments of the present invention, the basic DBR laser has the following specifications. The laser wavelength falls into a specific wavelength range, such as DBR. According to some embodiments, the phase bias current is zero and the wavelength falls into a wavelength range between 1541 nm and 1538 nm. The laser wavelength tuning range is greater than 10 nm with a DBR bias current less than 20 mA. The laser phase bias current value is less than 1.5 mA for the first wavelength tuning cycle. The laser average output power is greater than 5 dBm, SMSR is greater than 35 dB, and TEC is 30 C. The laser modulation response bandwidth is greater than 2.5 GHz.

Tunable ONU DBR Laser Self-Characterization Before Registration in Flexible Grid TWDM-PON System According to some embodiments of the present invention, a DBR (distributed Bragg reflector) laser backside photodiode detector (PD) power monitor is used to find the laser DBR bias current values for the modes with two or more different phase bias current values. For one phase bias, the laser has a set of DBR bias values, which are related to the laser modes (e.g., wavelengths). For another phase bias value, the laser has a different set of DBR bias values which are related to another set of wavelengths. The two sets of DBR current bias values are stored into memory. These two sets of DBR values correspond to two sets of laser wavelengths. The wavelength value differences between the sets of wavelengths which are related to the same laser mode are decided by the difference between the two phase bias currents. The two phase current values make the related DBR wavelength mode shift larger than the rejection band between the two channels of cyclic DeMUX and less than the pass band of cyclic DeMUX. DBR-based tunable ONU now is ready to be connected to system for registration processing.

Section G: DBR-Based ONU Tunable Transmitter Channel Set-Up I.

Figure 12:
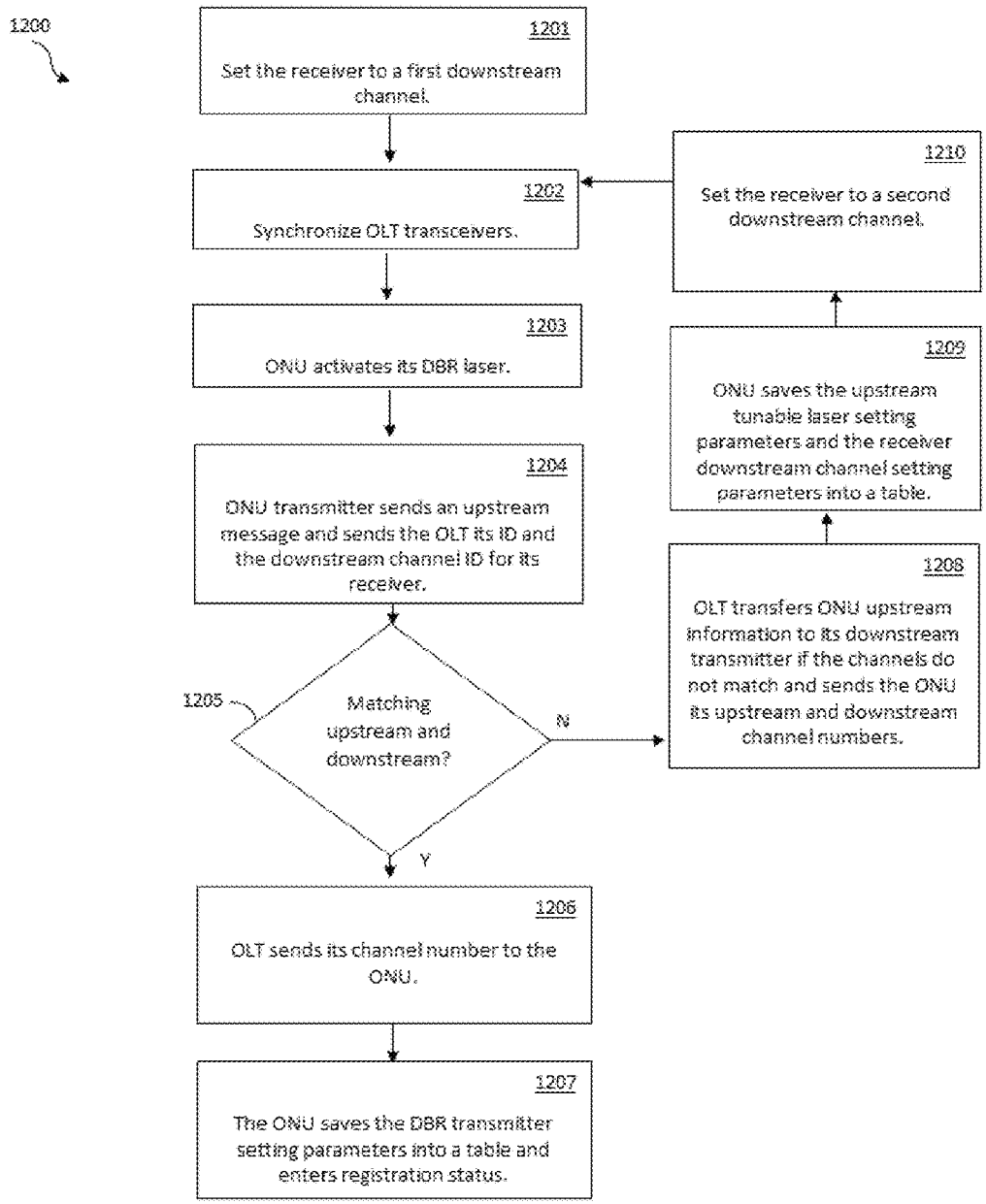
FIG. 12 is a flow chart illustrating an exemplary ONU tunable transmitter channel set-up procedure according to embodiments of the present invention.

An exemplary ONU tunable transmitter channel set-up procedure 1200 is depicted in FIG. 12 according to embodiments of the present invention. According to some embodiments, to perform channel checking and matching, the receiver is first set to a downstream channel (step 1201), and the OLT synchronizes its transceivers (step 1202). A timeslot (e.g., time window) is opened for channel checking and matching processing for the channels (step 1203). After a new ONU receives a channel checking message from one of the OLT channels, including its downstream channel ID, the ONU turns on its DBR laser (step 1203). The ONU transmitter sends an upstream message and sends the OLT its identification and the downstream channel ID for its receiver (step 1204). The OLT checks its downstream and upstream channel numbers (step 1205). If the downstream and upstream of the ONU are at the same channel, the OLT sends the ONU its channel number (step 1206). The ONU saves the DBR transmitter setting parameters (e.g., gain, phase, DBR bias current values, and TEC temperature) into the table and proceeds to a registration status (step 1207). When another channel set-up time slot comes, ONU finds another DBR transmitter bias parameters for another upstream channel. If the upstream and downstream channels are not at same channel, the OLT sends upstream channel information to the downstream channel transmitter and that downstream channel transmitter transfers the information to the ONU. The ONU then saves these parameters into the table until the DBR mode settings are complete. Once this process is completed, the ONU has found the upstream channel setting parameters and finished its upstream channel setting processing.

Section H: DBR-Based ONU Tunable Transmitter Channel Set-Up II.

Still with regard to FIG. 12, following the DBR-Based ONU Tunable Transmitter procedure of Section G, according to some embodiments of the present invention, if the ONU downstream and upstream channels are not matching, the OLT transfers the ONU upstream information to its downstream transmitter, which is related to the ONU receiver receiving channel, and that OLT transmitter sends the ONU its upstream and downstream channel numbers (step 1208). The ONU saves the upstream tunable laser setting parameters (e.g., gain, phase, DBR current, and TEC temperature) and the receiver downstream channel setting parameters into a table resident in memory (step 1209). When a next channel setting message (e.g., a new time slot) arrives, the ONU repeats the processing steps of Section G disclosed above (step 1210). If the ONU downstream and upstream channels are not matching, the previous processing steps of this section are repeated. The ONU completes the DBR laser channel setting parameters and save the setting parameters into a table resident in memory.

Section I: The DBR-Based ONU Tunable Transmitter Channel Set-Up III.

When two or more ONU upstream messages overlap at an OLT receiver channel, the OLT is not able to receive all messages from the ONUs. Based on the average optical power the receiver receives, the OLT determines that the upstream message has crashed. The OLT broadcasts an upstream crashed message and inform that channel's ONUs of the crash. After the ONUs receive the message, the ONUs attempts the same channel during the next checking and matching window after a random delay. The ONUs then follow the procedures of Section G disclosed above.

Section J: DBR-Based ONU Tunable Transmitter Channel Set-Up IV.

When the upstream signal is too weak to determine its channel for the OLT, the OLT does not send a downstream message, and the ONU does not receive any response to its upstream message. The ONU determines that it is not on the upstream channel, and the ONU upstream wavelength may fall into the rejection band of the cyclic DeMUX. The ONU switches its DBR laser and phase bias current values simultaneously and makes the laser wavelength shift larger than its channel rejection bandwidth. The ONU repeats this step until it determines its upstream channel. On average, the ONU upstream wavelength located its upstream channel range on the second attempt. The ONU then waits for the next downstream timeslot for a channel checking and matching message.

Section K: ONU Tunable Receiver Channel Set-Up.

After finishing upstream channel set-up as described above, an ONU receiver has completed one downstream channel set-up. According to some embodiments, the following procedure completes the ONU receiver downstream set-up for all other channels (this processing also useful for DFB laser based ONU tunable receiver channel set-up). The ONU sets its tunable receiver to another downstream channel. It repeats DBR laser channel set-up of Section G or H and determine the tunable filter setting downstream channel number. The ONU saves that channel tunable receiver setting parameters into a table resident in memory. The ONU then sets its receiver to another channel. The above steps are repeated and the ONU finds all downstream channel setting parameters and save the setting parameters into the table. ONU has finished its upstream and downstream channel setting processing.

Section L: Three-Section Tunable DBR Laser Mode Space Optimization for Flexible Grid TWDM-PON System According to some embodiments, after the DBR laser-based ONU determines one upstream channel, the ONU may find its other upstream channels automatically. The DBR laser mode space is nearly uniform, and the DBR laser mode space value may approximate the near upstream channel space value. After one upstream channel is determined, the closest bias current value (e.g., DBR current bias increasing direction) of the DBR laser corresponds to its adjacent shorter wavelength channel. For the DBR bias current decreasing direction, the immediate front DBR bias current value is related to its adjacent longer wavelength channel. Therefore, if one DBR bias current value produces the laser wavelength at channel 1, the next closest DBR bias current value tunes the laser wavelength to channel 2, and its immediate front DBR bias current value tunes the laser wavelength to the last channel of the cyclic demultiplexers for the same DBR laser phase bias current value.

Figure 7:
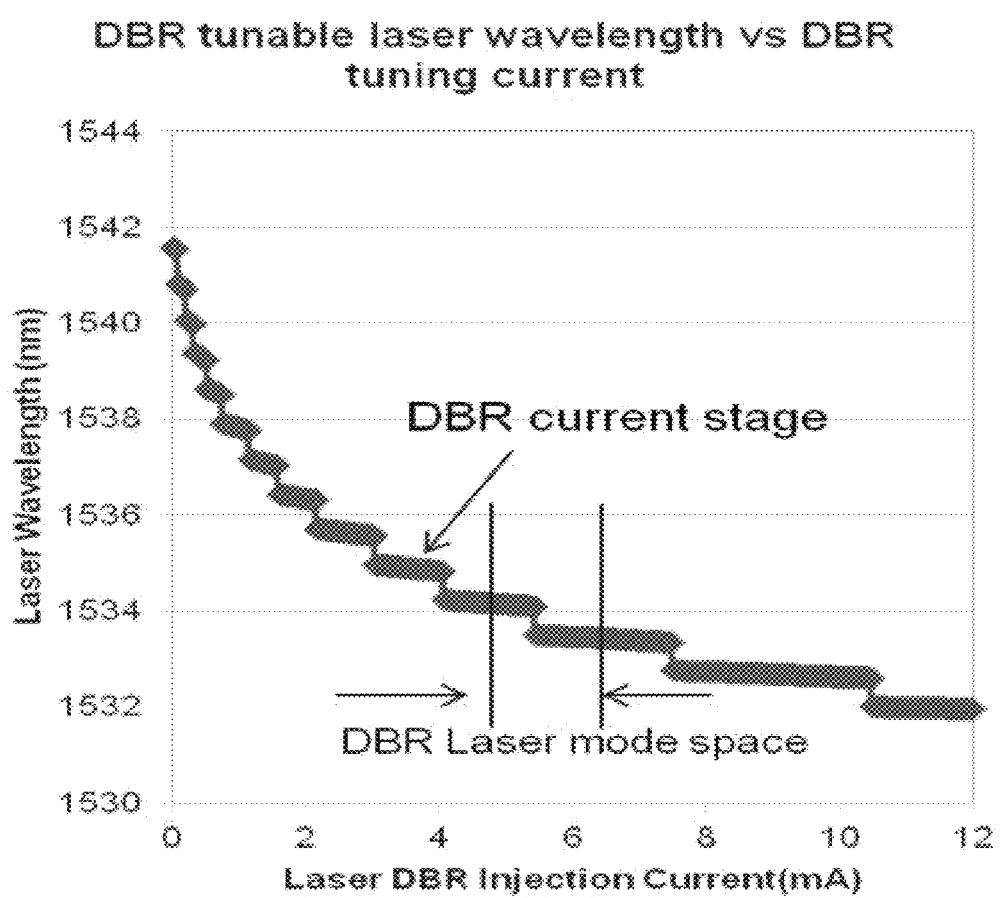
FIG. 7 is a graph of experimental DBR laser wavelength tuning and hopping results with DBR bias current increasing according to embodiments of the present invention.

With regard to FIG. 7, exemplary DBR laser wavelength tuning and hopping results with DBR bias current increasing are depicted according to embodiments of the present invention. The DBR laser mode hoping step results, from 0 mA to 12 mA, are: 0.721 nm 0.7327 nm 0.7393 nm 0.749 nm 0.756 nm 0.715 nm 0.72 nm 0.736 nm 0.7372 nm 0.7468 nm 0.7461 nm (where DBR section is biased at the middle of each stage).

DBR Laser-Based Tunable ONU Upstream Channel Alignment Experimental Results

Figure 8:
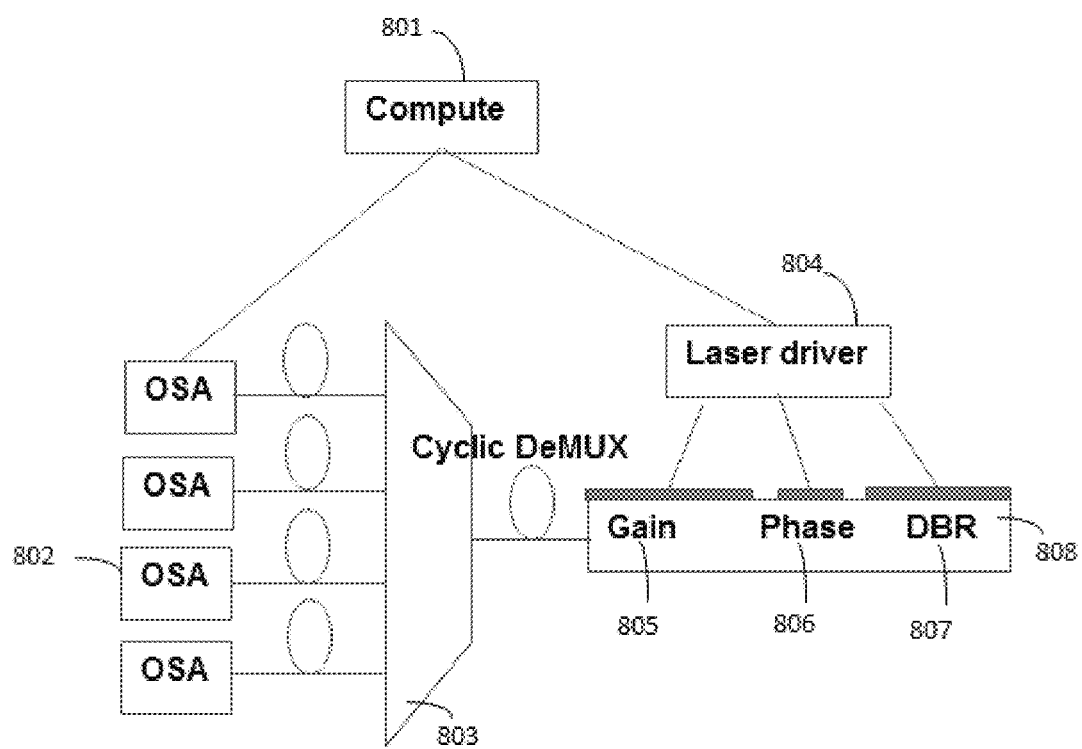
FIG. 8 is a diagram illustrating an exemplary upstream channel experimental set-up schematic according to embodiments of the present invention.

With regard to FIG. 8, an exemplary set-up diagram is depicted according to some embodiments of the present invention. A 4-channel cyclic demultiplexers (DeMUX) 803 is used. Its passband width is 90 GHz for 1.0 dB and its insertion loss is about 3.0 dB. The DBR laser 808 connect to cyclic DeMUX 803 input port and the DeMUX 803 output ports are connected to optical spectrum analyzer (OSA) 802. A computer 801 is connected with OSA 802 and a laser driver 804. The computer controls the laser gain 805, phase 806, and DBR bias current 807. An OSA (e.g., OSA 802) reports output power from the cyclic DeMUX 803 output channel to the computer. Matlab codes are used to report output power, according to some embodiments.

Figure 9:
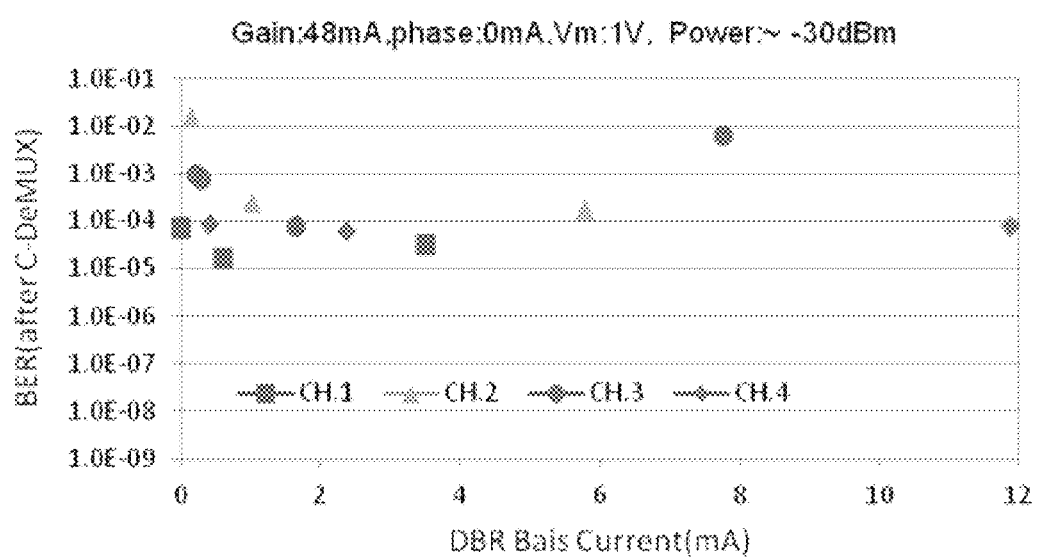
FIG. 9 is a chart illustrating exemplary DBR tunable laser upstream channel alignment results for 4 channels according to embodiments of the present invention.

With regard to FIG. 9, a chart illustrating exemplary DBR tunable laser upstream channel alignment results for 4 channels according to embodiments of the present invention. The bit-error rate (BER) after C-DeMUX is illustrated along the vertical axis, and the DBR Bias Current in mA is illustrated along the horizontal axis under the following conditions: Gain is 48 mA, Phase is 0 mA, Vm (RF modulation voltage) is 1V, and optical power is about −30 dBm. The Channel 1 results are depicted by the square markings, the Channel 2 results are depicted by the triangular markings, the Channel 3 results are depicted by the circular markings, and the Channel 4 results are depicted by the diamond makings.

Embodiments of the present invention are thus described. While the present invention has been described in particular embodiments, it should be appreciated that the present invention should not be construed as limited by such embodiments, but rather construed according to the following claims.

What is claimed is:

1. An optical line terminal (OLT) comprising:
   an optical transmitter array comprising:
     a first optical transmitter configured to transmit a first optical signal at a first wavelength, and
     a second optical transmitter configured to transmit a second optical signal at a second wavelength, wherein the first optical signal and the second optical signal comprise intermediate grid wavelength values;
   an optical combiner coupled to the optical transmitter array and configured to:
     receive the first optical signal from the first optical transmitter,
     receive the second optical signal from the second optical transmitter,
     combine the first optical signal and the second optical signal to create a multi-wavelength optical signal, and
     output the multi-wavelength optical signal;
   an optical amplifier coupled to the optical combiner and configured to boost optical power of the multi-wavelength optical signal; and
   an optical receiver array indirectly coupled to the optical combiner and configured to receive upstream signals from a tunable optical network unit (ONU).

2. The OLT of claim 1, further comprising a wavelength-division multiplexing (WDM) filter coupled to the optical amplifier and configured to:
   selectively transmit downstream messages generated by the optical transmitter array, and
   selectively receive the upstream signals generated by the tunable ONU.

3. The OLT of claim 2, further comprising a cyclic demultiplexer coupled to the WDM filter and the optical receiver array so that the cyclic demultiplexer is positioned between the WDM filter and the optical receiver array, wherein the cyclic demultiplexer is configured to pass the upstream signals from the WDM filter to the optical receiver array.

4. The OLT of claim 3, wherein the optical transmitter array comprises four or eight downstream wavelength transmitters.

5. The OLT of claim 4, wherein the optical combiner comprises a multimode interface (MMI) or star coupler.

6. The OLT of claim 3, wherein the optical transmitter array comprises a monolithic integration laser array.

7. The OLT of claim 3, wherein a passband width of the cyclic demultiplexer is larger than a rejection band width of the cyclic demultiplexer.

8. The OLT of claim 3, wherein a passband width of the cyclic demultiplexer is larger than 60% of a channel space of the cyclic demultiplexer.

9. A method implemented in an optical line terminal (OLT), the method comprising:
transmitting, by a first optical transmitter in an optical transmitter array a first optical signal at a first wavelength;
transmitting, by a second optical transmitter in the optical transmitter array, a second optical signal at a second wavelength;
receiving, by an optical combiner coupled to the optical transmitter array, the first optical signal from the first optical transmitter;
receiving, by the optical combiner, the second optical signal from the second optical transmitter;
combining, by the optical combiner, the first optical signal and the second optical signal to create a multi-wavelength optical signal;
outputting, by the optical combiner, the multi-wavelength optical signal;
boosting, by an optical amplifier coupled to the optical combiner, optical power of the multi-wavelength optical signal; and
receiving, by an optical receiver array indirectly coupled to the optical combiner, upstream signals from a tunable optical network unit (ONU).

10. The method of claim 9, further comprising:
receiving, by the tunable ONU, the first optical signal and the second optical signal;
selectively transmitting, by a wavelength-division multiplexing (WDM) filter coupled to the optical amplifier, downstream messages generated by the optical transmitter array; and
selectively receiving, by the WDM filter, the upstream signals.

11. The method of claim 10, further comprising passing, by a cyclic demultiplexer coupled to the WDM filter and the optical receiver array so that the cyclic demultiplexer is positioned between the WDM filter and the optical receiver array, the upstream signals from the WDM filter to the optical receiver array.

12. The method of claim 11, wherein the optical transmitter array comprises four or eight downstream wavelength transmitters.

13. The method of claim 12, wherein the optical combiner comprises a multimode interface (MMI) or star coupler.

14. The method of claim 11, wherein the optical transmitter array comprises a monolithic integration laser array.

15. The method of claim 11, wherein a passband width of the cyclic demultiplexer is larger than a rejection band width of the cyclic demultiplexer.

16. The method of claim 11, wherein a passband width of the cyclic demultiplexer is larger than 60% of a channel space of the cyclic demultiplexer.

17. A method of manufacturing an optical line terminal (OLT), the method comprising:
obtaining an optical transmitter array comprising:
a first optical transmitter configured to transmit a first optical signal at a first wavelength, and
a second optical transmitter configured to transmit a second optical signal at a second wavelength;
obtaining an optical combiner configured to:
receive the first optical signal from the first optical transmitter,
receive the second optical signal from the second optical transmitter,
combine the first optical signal and the second optical signal to create a multi-wavelength optical signal, and
output the multi-wavelength optical signal;
coupling the optical combiner to the optical transmitter array;
obtaining an optical amplifier configured to boost optical power of the multi-wavelength optical signal; and
coupling the optical amplifier to the optical combiner;
obtaining an optical receiver array configured to receive upstream signals from a tunable optical network unit (ONU); and
indirectly coupling the optical receiver array to the optical combiner.

18. The method of claim 17, further comprising:
obtaining a wavelength-division multiplexing (WDM) filter configured to:
selectively transmit downstream messages generated by the optical transmitter array, and
selectively receive the upstream signals generated by the tunable ONU; and
coupling the WDM filter to the optical amplifier.

19. The method of claim 18, further comprising:
obtaining a cyclic demultiplexer, and
coupling the cyclic demultiplexer to the WDM filter and the optical receiver array so that the cyclic demultiplexer is positioned between the WDM filter and the optical receiver array.

20. The method of claim 19, wherein the optical transmitter array comprises four or eight downstream wavelength transmitters.

21. The OLT of claim 1, wherein at least one of the first optical transmitter and the second optical transmitter is wavelength tunable.

22. The method of claim 14, wherein at least one of the first optical transmitter and the second optical transmitter is wavelength tunable.

* * * * *